US008661965B2

(12) United States Patent
Scharp et al.

(10) Patent No.: US 8,661,965 B2
(45) Date of Patent: Mar. 4, 2014

(54) PISTON FOR AN INTERNAL COMBUSTION ENGINE

(75) Inventors: Rainer Scharp, Vaihingen (DE); Michael Ullrich, Moeglingen (DE)

(73) Assignee: MAHLE International GmbH, Stuttgart (DE)

( * ) Notice: Subject to any disclaimer, the term of this patent is extended or adjusted under 35 U.S.C. 154(b) by 229 days.

(21) Appl. No.: 13/066,553

(22) Filed: Apr. 18, 2011

(65) Prior Publication Data

US 2012/0160204 A1 Jun. 28, 2012

(30) Foreign Application Priority Data

Dec. 24, 2010 (DE) ........................ 10 2010 056 220

(51) Int. Cl.
*F16J 1/04* (2006.01)
*F01B 31/08* (2006.01)
*F02F 3/00* (2006.01)

(52) U.S. Cl.
USPC ............................ 92/222; 92/186; 123/193.6

(58) Field of Classification Search
USPC ...................................................... 123/193.6
See application file for complete search history.

(56) References Cited

U.S. PATENT DOCUMENTS 4,587,932 A 5/1986 Moebus
6,532,913 B1 3/2003 Opris
6,659,062 B1 * 12/2003 Issler ........................ 123/193.6
6,763,757 B2 * 7/2004 Huang et al. .................... 92/186
6,789,460 B2 * 9/2004 Kohnert .......................... 92/186
7,743,745 B2 * 6/2010 Scharp ....................... 123/193.6
2004/0250779 A1 * 12/2004 Scharp ....................... 123/41.39
2007/0283917 A1 * 12/2007 Lapp et al. ................. 123/193.6
2009/0071001 A1 3/2009 Kondoh et al.
2011/0168016 A1 7/2011 Fedyna et al.

FOREIGN PATENT DOCUMENTS

DE 123 962 1/1977
DE 100 40 486 3/2002
DE 100 47 258 4/2002
DE 10 2007 036 236 2/2009
DE 10 2008 046 115 3/2009
DE 10 2008 035 698 2/2010

OTHER PUBLICATIONS

German Search Report dated Sep. 7, 2011 in German Application No. 10 2010 056 220.3 with English translation of the relevant parts.

* cited by examiner

*Primary Examiner* — Rinaldi Rada
*Assistant Examiner* — Syed O Hasan
(74) *Attorney, Agent, or Firm* — Collard & Roe, P.C.

(57) ABSTRACT

The present invention relates to a piston (10, 110, 210) for an internal combustion engine, having a first piston component (11) and a second piston component (12), which jointly form a circumferential cooling channel (23) that is open toward the second piston component (12), whereby the first piston component (11) forms at least a part of a piston crown (13) as well as an outer circumferential wall (34) of the cooling channel, characterized in that the outer circumferential wall (34) of the cooling channel (23) has a circumferential projection (32) below the piston crown (13), which projection is provided with a circumferential guide surface (33) for coolant, directed radially inward.

12 Claims, 2 Drawing Sheets

PISTON FOR AN INTERNAL COMBUSTION ENGINE

CROSS REFERENCE TO RELATED APPLICATIONS

Applicants claim priority under 35 U.S.C. §119 of German Application No. 10 2010 056 220.3 filed on Dec. 24, 2010, the disclosure of which is incorporated by reference.

BACKGROUND OF THE INVENTION

1. Field of the Invention

The present invention relates to a piston for an internal combustion engine, having a first piston component and a second piston component, which jointly form a circumferential cooling channel that is open toward the second piston component, which channel is closed off by means of a circumferential closure element.

2. The Prior Art

Pistons of this type, having a circumferential cooling channel, are known. A fundamental problem consists in optimizing the cooling effect of the coolant that circulates in the cooling channel. For this purpose, it is necessary to transport the coolant, in targeted manner, to the regions of the piston that are exposed to particularly high temperatures during engine operation. This particularly relates to those regions of the cooling channel that lie below the piston crown, since the latter is exposed to the full ignition temperature during operation, so that a significant amount of heat has to be carried away.

SUMMARY OF THE INVENTION

The task of the present invention therefore consists in further developing a piston of the stated type, in such a manner that the cooling effect in the regions subject to great temperature stress is optimized.

The solution consists in that the outer circumferential wall of the cooling channel has a circumferential projection below the piston crown, the projection being provided with a circumferential guide surface for coolant, directed radially inward.

It is therefore provided, according to the invention, that the coolant is guided, in targeted manner, into the regions of the cooling channel that are exposed to particularly high temperature stresses. This is achieved, in an individual case, in each instance, by means of the placement of the guide surface. The known shaker effect in engine operation brings about the result that the coolant impacts against the guide surface during the downward stroke, and is deflected into the regions subject to high temperature stress, in targeted manner.

Advantageous further developments are evident from the dependent claims.

The guide surface can be configured as a surface that is straight, in and of itself, or as a surface that is curved, in and of itself.

The guide surface is preferably disposed so as to be inclined in the direction of the piston crown, toward the center piston axis. In this manner, the inner upper region of the cooling channel, in particular, which is subject to very great temperature stress, can be cooled in particularly effective manner.

In a preferred embodiment, the piston according to the invention has a combustion chamber bowl, whereby the first piston component forms at least one wall region of the combustion chamber bowl, which makes a transition into the piston crown. The first piston component obtained in this manner is easy to produce, for example by means of casting, and can be connected with the second piston component without problems, preferably by means of a friction-welding method.

In another preferred embodiment, the cooling channel of the piston according to the invention is closed off with a closure element that is connected with the first piston component and extends radially in the direction of the center axis of the piston, whereby the second piston component has a circumferential contact flange that extends radially in the direction of the first piston component, and whereby the closure element lies on the contact flange or supports itself on a face surface of the contact flange with a circumferential lower edge. The closure element is therefore configured as a structural element of the first piston component, so that a sheet-metal ring for closing the cooling channel is no longer required, and an assembly step for the production of the piston according to the invention is eliminated. The piston no longer has any loose components.

The closure element is preferably configured in one piece with the first piston component, in order to further simplify the production method. Of course, the closure element can also be produced as a separate component and connected with the first piston component in fixed manner. In corresponding manner, it is preferred that the contact flange is in one piece with the second piston component.

The radial width of the closure element and of the contact flange can be dimensioned to be the same size or different sizes. In particular, the radial width of the contact flange can be greater than the radial width of the closure element. Preferably, the closure element lies on the contact flange with bias, in order to seal the cooling channel off in particularly reliable manner. In this case, in particular, it is practical if the face surface of the contact flange is disposed inclined in the direction toward the closure element, in order to optimize sealing of the cooling channel. However, the closure element and the contact flange can also be connected with one another by means of a joining method, for example welding or soldering.

It is practical if at least one coolant entry opening and at least one coolant exit opening are provided in the closure element and/or in the contact flange.

Preferably, the piston skirt is configured to be thermally uncoupled from the ring belt.

BRIEF DESCRIPTION OF THE DRAWINGS

Exemplary embodiments of the invention will be explained in greater detail below, using the attached drawings. These show, in a schematic representation, not true to scale.

DETAILED DESCRIPTION OF THE PREFERRED EMBODIMENTS

Figure 1:
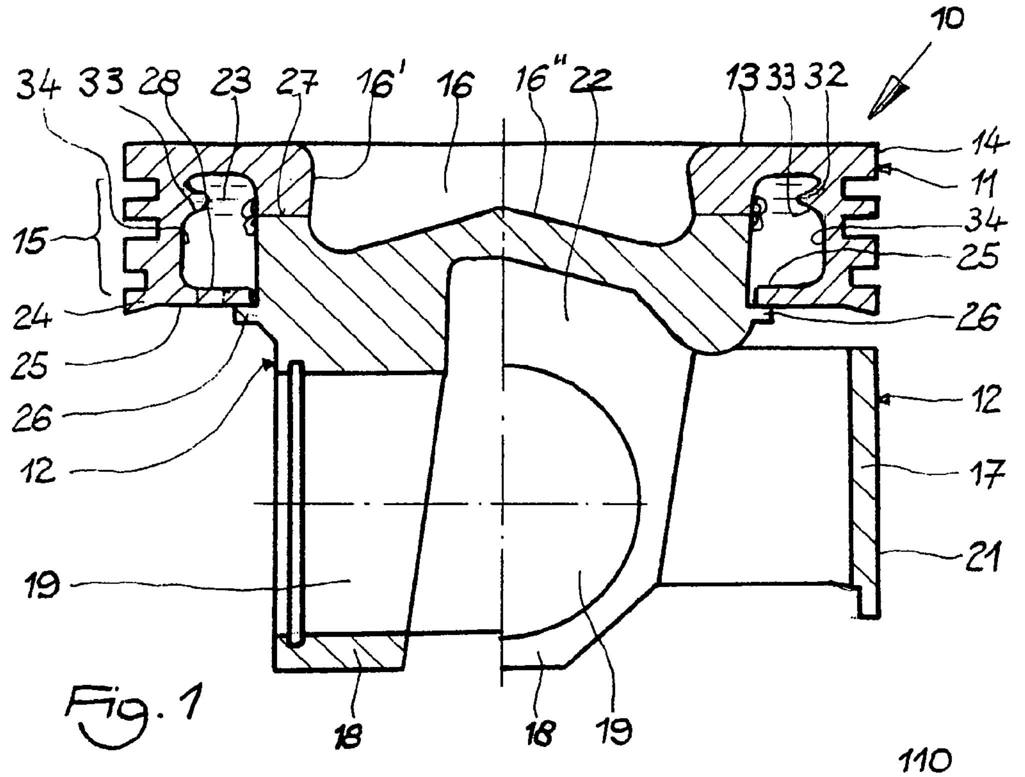
FIG. 1 an exemplary embodiment of a piston according to the invention, in section, whereby the right half is rotated by 90° relative to the left half.

FIG. 1 shows a first exemplary embodiment of a piston 10 according to the invention. The piston 10 consists of a first piston component 11 and a second piston component 12. In the present exemplary embodiment, the first piston component 11 is configured as a piston ring element, and the second piston component 12 is configured as a piston base body for a box piston. Other divisions are also possible, as long as the ring belt 15 (see below) is formed by the first piston component 11 at least in the region of its free end 24 (see below). Both components can consist of any suitable metallic material.

In the exemplary embodiment, the first piston component 11 has a piston crown 13 as well as a circumferential top land 14 and a circumferential ring belt 15 having ring grooves for accommodating piston rings (not shown). The first piston component 11 furthermore forms a wall region 16' of a combustion chamber bowl 16.

In the present exemplary embodiment, the second piston component 12 forms a piston skirt 17 that is thermally uncoupled from the ring belt 15, and is provided, in known manner, with pin bosses 18 and pin bores 19 for accommodating a piston pin (not shown). The pin bosses 18 are connected with one another by way of working surfaces 21. The second piston component 12 furthermore forms a crown region 16" of the combustion chamber bowl 16. The pin bosses 18 are tied into the underside of the combustion chamber bowl 16 by way of pin boss links 22.

The first piston component 11 and the second piston component 12 are connected with one another by way of a joining seam 27, by means of friction welding, in the exemplary embodiment. The joining seam 27 is disposed in the region of the combustion chamber bowl 16 in the exemplary embodiment. However, this is not compulsory; the important thing is that the ring belt 15 is formed by the first piston component 11 at least in the region of its free end 24 (see below).

The ring belt 15 of the first piston component 11, together with the second piston component 12, forms a circumferential cooling channel 23 that is open toward the second piston component, in known manner, whereby the first piston component 11 forms an outer circumferential wall 34 of the cooling channel 23. Below the piston crown 13, the outer circumferential wall 34 has a circumferential projection 32, which projection is provided with a circumferential guide surface 33 for coolant, directed radially inward.

Figure 4:
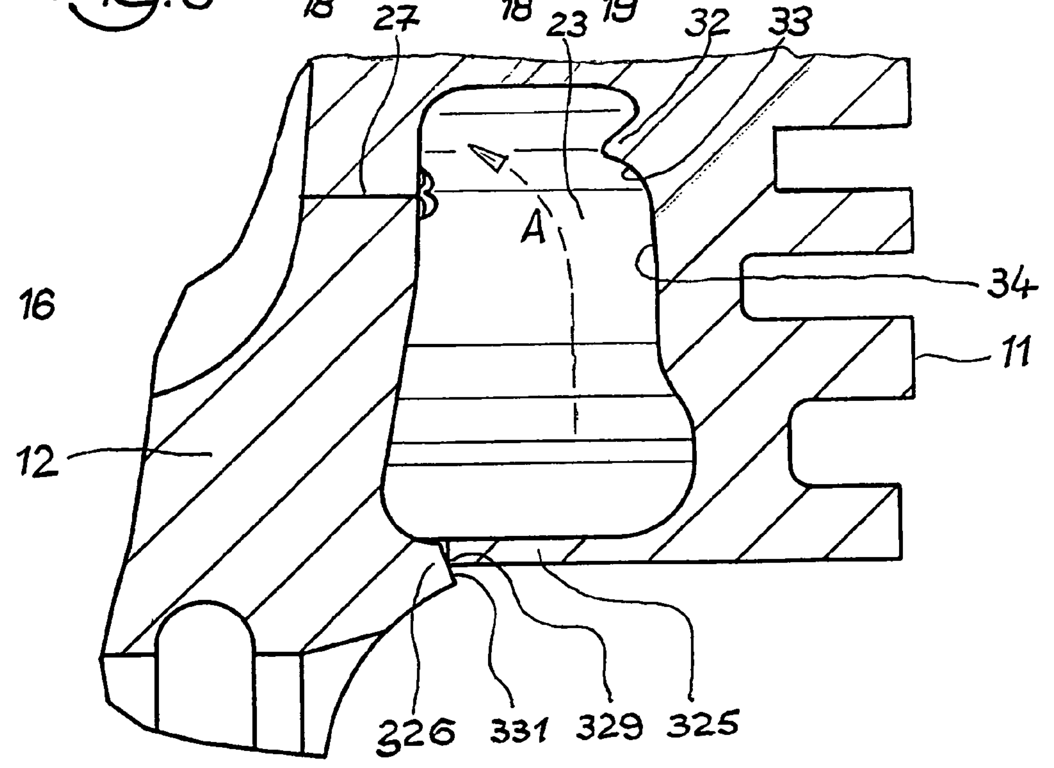
FIG. 4 a detail view of another exemplary embodiment of a piston according to the invention, in section.

As is particularly evident from FIG. 4, in the exemplary embodiment, the guide surface 33 is configured as a surface that is curved, in and of itself, and disposed inclined in the direction of the piston crown 13, toward the center piston axis M. In this manner, the coolant stream is guided, in targeted manner, in the direction of the arrow A, toward the wall region 16' of the combustion chamber bowl 16, which region is formed by the first piston component 11 and is exposed to particularly high temperature stresses.

The projection 32 can be lathed into the first piston component 11, for example.

In order to close off the cooling channel 23, the ring belt 15 has a closure element 25 at its free, lower end 24. The closure element 25 extends radially in the direction of the second piston component 12 and is connected in one piece with the free end 24 of the ring belt 15 of the first piston component 11, in the exemplary embodiment. The second piston component 12 has a circumferential contact flange 26 approximately at the height of the pin boss links 22, in the exemplary embodiment. The flange 26 is in one piece with the second piston component 12.

The closure element 25 and the contact flange 26 are dimensioned in such a manner that after the first piston component 11 and the second piston component 12 are joined, the closure element 25 lies on the contact flange 26. In this connection, the closure element 25 can lie on the contact flange 26 in relaxed manner or under bias. In the latter case, a particularly reliable seal of the cooling channel 23 exists. The closure element 25 and the contact flange 26 can also be additionally connected with one another by means of joining, for example welding or soldering.

In the exemplary embodiment shown in FIG. 1, the radial width of the closure element 25 is dimensioned to be greater than the radial width of the contact flange 26, and extends almost over the entire cross-section of the cooling channel 23 in this individual case. For this reason, the openings 28 for entry and exit of the coolant are introduced into the closure element 25.

Figure 2:
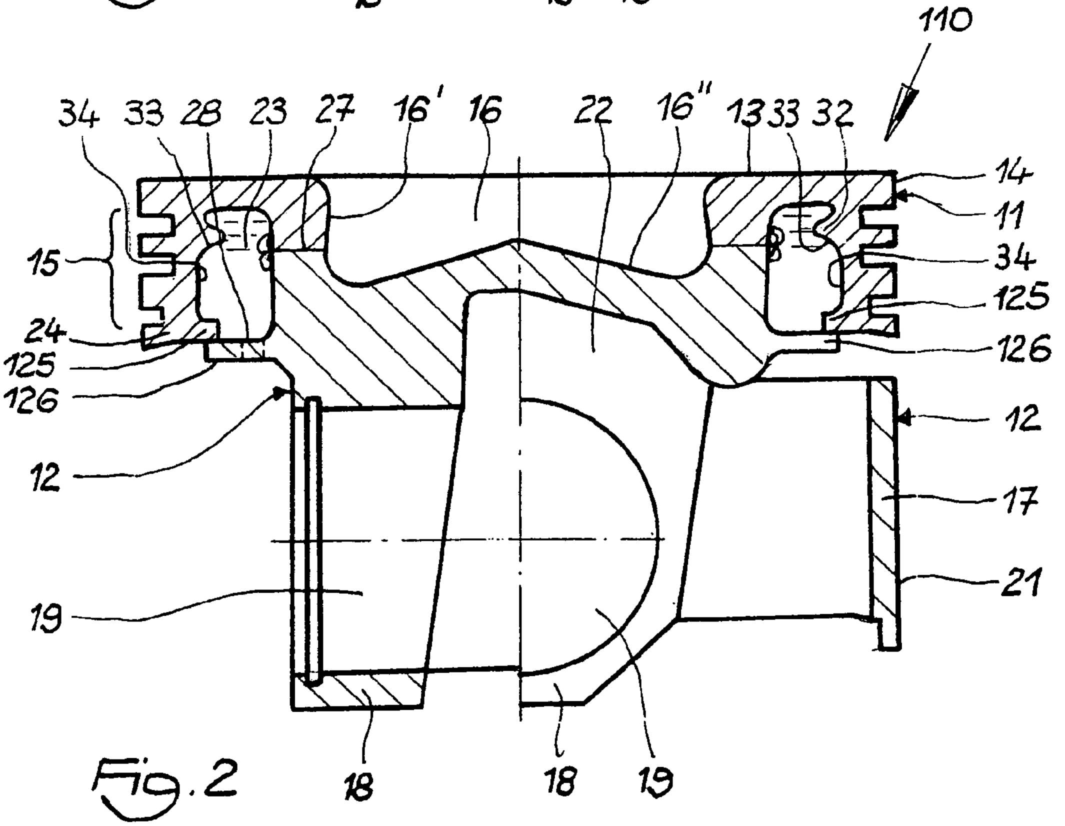
FIG. 2 another exemplary embodiment of a piston according to the invention, in section, whereby the right half is rotated by 90° relative to the left half.

FIG. 2 shows another exemplary embodiment of a piston 110 according to the invention. The piston 110 corresponds to the piston 10 according to FIG. 1, to a great extent, so that the same reference symbols are provided for the same structural elements, and reference is made, in this regard, to the description of FIG. 1.

Figure 3:
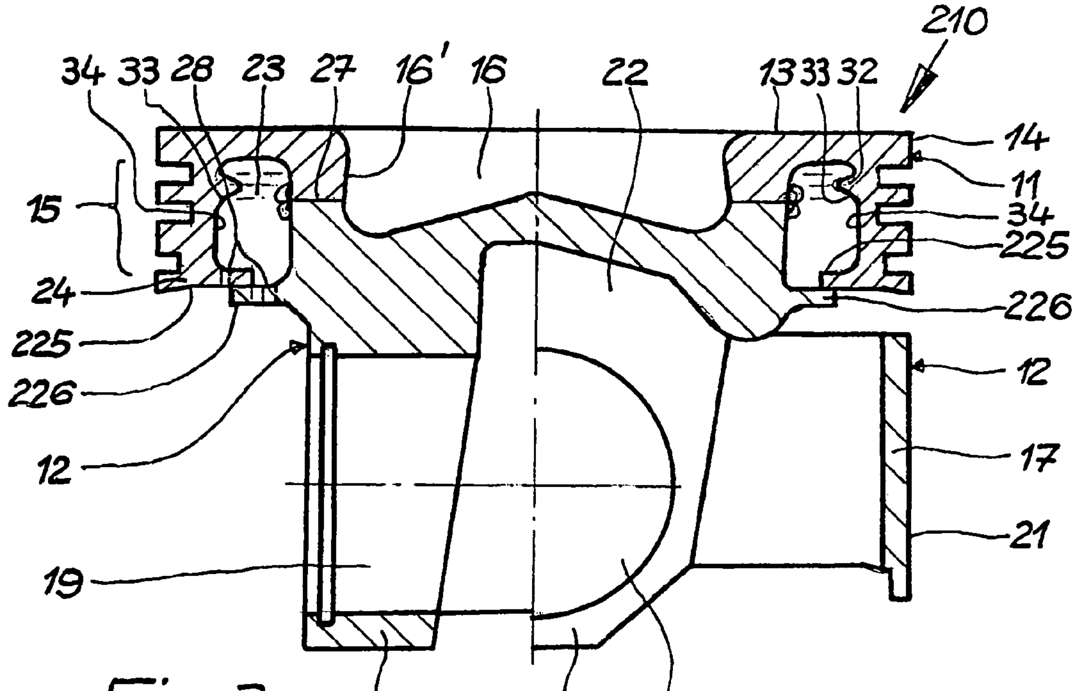
FIG. 3 another exemplary embodiment of a piston according to the invention, in section, whereby the right half is rotated by 90° relative to the left half.

The essential difference as compared with the exemplary embodiment shown in FIG. 1 consists in that the radial width of the closure element 125 is dimensioned to be smaller than the radial width of the contact flange 126. In this exemplary embodiment, the contact flange 126 extends almost over the entire cross-section of the cooling channel 23 in this individual case. For this reason, the openings 28 for entry and exit of the coolant are introduced into the contact flange 126. FIG. 3 shows another exemplary embodiment of a piston 210 according to the invention. The piston 210 corresponds to the piston 10 according to FIG. 1, to a great extent, so that the same reference symbols are provided for the same structural elements, and reference is made, in this regard, to the description of FIG. 1.

The essential difference as compared with the exemplary embodiment shown in FIG. 1 consists in that the radial width of the closure element 225 corresponds approximately to the radial width of the contact flange 226. For this reason, the openings 28 for entry and exit of the coolant are introduced not only into the closure element 225 but also into the contact flange 226.

FIG. 4 shows a detail view of another exemplary embodiment of a piston 310 according to the invention. The piston 310 corresponds to the piston 10 according to FIG. 1, to a great extent, so that the same reference symbols are provided for the same structural elements, and reference is made, in this regard, to the description of FIG. 1.

The essential difference as compared with the exemplary embodiment shown in FIG. 1 consists in that the closure element 325 has a circumferential lower edge 329 and the contact flange 326 has a face surface 331. The face surface 331 of the contact flange 326 is disposed inclined in the direction toward the closure element 325. The circumferential lower edge 329 of the closure element 325 supports itself, if necessary under bias, on the face surface 331 of the contact flange 326. In this connection, the openings 28 for entry and exit of the coolant are introduced into the closure element 325.

The invention claimed is:

1. Piston (10, 110, 210, 310) for an internal combustion engine, having a first piston component (11) and a second piston component (12), which are connected with one another by a friction welding method, and which jointly form a circumferential cooling channel (23) that is open toward the second piston component (12), whereby the first piston component (11) forms at least a part of a piston crown (13) as well as an outer circumferential wall (34) of the cooling channel (23), wherein the piston (10, 110, 210, 310) has a combustion chamber bowl (16), wherein the first piston component (11) forms a wall (16') of the combustion chamber bowl (16), which makes a transition into the piston crown (13), wherein the second piston component (12) forms a crown region (16") of the combustion chamber bowl (16), wherein a joining seam (27) formed by means of said friction welding method is disposed in a region of the combustion chamber bowl (16), wherein the outer circumferential wall (34) of the cooling channel (23) has a circumferential projection (32) below the piston crown (13), said projection (32) being provided with a circumferential guide surface (33) for coolant, directed radially inward, said projection (32) being disposed opposite from said joining seam (27) within the circumferential cooling channel (23), and said projection (32) being disposed above said joining seam (27) in a cylinder axis direction.

2. Piston according to claim 1, wherein the guide surface (33) is configured as a surface that is straight, in and of itself, or as a surface that is curved, in and of itself.

3. Piston according to claim 1, wherein the guide surface (33) is disposed so as to be inclined in the direction of the piston crown (13), toward the center piston axis (M).

4. Piston according to claim 1, wherein the cooling channel (23) is closed off with a closure element (25, 125, 225, 325) that is connected with the first piston component (11) and extends radially in the direction of the center axis (M) of the piston (10, 110, 210, 310), wherein the second piston component (12) has a circumferential contact flange (26, 126, 226, 326) that extends radially in the direction of the first piston component (11), and wherein the closure element (25, 125, 225) lies on the contact flange (26, 126, 226) or wherein the closure element (325) supports itself on a face surface (331) of the contact flange (326) with a circumferential lower edge (329).

5. Piston according to claim 1, wherein the closure element (25, 125, 225, 325) is configured in one piece with the first piston component (11).

6. Piston according to claim 1, wherein the contact flange (26, 126, 226, 326) is configured in one piece with the second piston component (12).

7. Piston according to claim 1, wherein the radial width of the closure element (25, 125, 225, 325) and of the contact flange (26, 126, 226, 326) is dimensioned to be the same size or different sizes.

8. Piston according to claim 1, wherein the closure element (25, 125, 225) lies on the contact flange (26, 126, 226) under bias, or wherein the closure element (325) supports itself on the contact flange (326) under bias.

9. Piston according to claim 1, wherein the face surface (331) of the contact flange (326) is disposed inclined in the direction toward the closure element (325).

10. Piston according to claim 1, wherein the closure element (25, 125, 225, 325) and the contact flange (26, 126, 226, 326) are connected with one another by means of a joining method.

11. Piston according to claim 1, wherein at least one coolant entry opening (28) and at least one coolant exit opening (28) are provided in the closure element (25, 125, 225, 325) and/or in the contact flange (26, 126, 226, 326).

12. Piston according to claim 1, wherein the piston skirt (17) is configured to be thermally uncoupled from the ring belt (15).

* * * * *